US008841338B2

(12) United States Patent
Van Der Flaas et al.

(10) Patent No.: US 8,841,338 B2
(45) Date of Patent: Sep. 23, 2014

(54) SYNERGISTIC ANTIFOULING COMPOSITIONS COMPRISING 4-BROMO-2-(4-CHLOROPHENYL)-5-(TRIFLUOROMETHYL)-1*H*-PYRROLE-3-CARBONITRILE

(75) Inventors: Mark Arthur Josepha Van Der Flaas, Herselt (BE); Jan Remi Nys, Schilde (BE)

(73) Assignee: Janssen Pharmaceutica N.V., Beerse (BE)

( * ) Notice: Subject to any disclaimer, the term of this patent is extended or adjusted under 35 U.S.C. 154(b) by 723 days.

(21) Appl. No.: 13/043,650

(22) Filed: Mar. 9, 2011

(65) Prior Publication Data
US 2011/0160275 A1 Jun. 30, 2011

Related U.S. Application Data

(60) Division of application No. 11/698,631, filed on Jan. 26, 2007, now abandoned, which is a continuation of application No. 10/494,751, filed as application No. PCT/EP02/12376 on Nov. 5, 2002, now abandoned.

(30) Foreign Application Priority Data

Nov. 8, 2001 (EP) .................................... 01204322

(51) Int. Cl.
*A01N 43/36* (2006.01)
*A61K 31/40* (2006.01)
*C09D 5/16* (2006.01)

(52) U.S. Cl.
CPC .................................. *C09D 5/1625* (2013.01)
USPC ....................................................... 514/408

(58) Field of Classification Search
USPC ............................................. 514/617, 408
See application file for complete search history.

(56) References Cited

U.S. PATENT DOCUMENTS

| 5,712,275 | A | * | 1/1998 | Van Gestel | ................. 514/222.5 |
| 6,069,189 | A | | 5/2000 | Kramer et al. | |
| 6,291,549 | B1 | | 9/2001 | Metchel et al. | |
| 7,659,397 | B2 | | 2/2010 | Hidaka | |
| 2006/0089352 | A1 | | 4/2006 | Bruns et al. | |
| 2006/0246097 | A1 | | 11/2006 | Hidaka | |
| 2008/0090938 | A1 | | 4/2008 | Quaiser et al. | |
| 2008/0175812 | A1 | | 7/2008 | Seabrook et al. | |
| 2009/0017135 | A1 | | 1/2009 | Kempen | |
| 2009/0093443 | A1 | | 4/2009 | Kempen et al. | |
| 2010/0178357 | A1 | | 7/2010 | Kempen | |
| 2011/0160258 | A1 | | 6/2011 | Van der Flaas et al. | |
| 2011/0237632 | A1 | | 9/2011 | Kempen | |

FOREIGN PATENT DOCUMENTS

| EP | 0312723 | B1 | 8/1988 |
| EP | 0746979 | B1 | 12/1996 |
| EP | 0831134 | A1 | 3/1998 |
| EP | 1769680 | B1 | 4/2010 |
| JP | 2001-502732 | A | 4/1998 |
| WO | WO 95/05739 | A1 | 3/1995 |
| WO | WO 95/06043 | A1 | 3/1995 |
| WO | WO 98/12269 | A1 | 3/1998 |
| WO | WO 98/17732 | A1 | 4/1998 |
| WO | WO 01/95718 | A1 | 12/2001 |
| WO | WO 2005/025313 | A1 | 3/2005 |
| WO | WO 2005/075581 | A | 8/2005 |
| WO | WO 97/42823 | A1 | 8/2006 |
| WO | WO 2006/080890 | A1 | 8/2006 |
| WO | WO 2007/088172 | A2 | 8/2007 |
| WO | WO 2007/116051 | A1 | 10/2007 |
| WO | WO 2012/001027 | A2 | 1/2012 |

OTHER PUBLICATIONS

Kull et al., "Mixtures of Quaternary Ammonium Compounds and Long-chain Fatty Acids as Antifungal Agents.", Applied Microbiology, 1961, pp. 538-541, vol. 9.
International Search Report and Written Opinion of the International Searching Authority relating to International Patent Application No. PCT/EP2007/050927, which corresponds to U.S. Appl. No. 12/162,638. Date of Mailing: Aug. 10, 2007.
International Preliminary Report on Patentability of the Internatioal Preliminary Examining Authority relating to International Patent Application No. PCT/EP2007/050927, which corresponds to U.S. Appl. No. 12/162,638. Date of Mailing: May 26, 2008.
International Search Report and Written Opinion of the International Searching Authority relating to International Patent Application No. PCT/EP2007/053499, which corresponds to U.S. Appl. No. 12/296,353. Date of Mailing: Aug. 29, 2007.
International Search Report and Written Opinion of the International Searching Authority relating to International Patent Application No. PCT/EP2007/058132, which corresponds to U.S. Appl. No. 12/376,680. Date of Mailing: Feb. 6, 2008.
International Search Report and Written Opinion of the International Searching Authority relating to International Patent Application No. PCT/EP2009/066796, which corresponds to U.S. Appl. No. 13/132,821. Date of Mailing: Jan. 25, 2010.
U.S. Appl. No. 13/132,821, Kempen, Tony Mathilde Jozef.
Copper Development Association, CDA Technical Note TN11, 1972, pp. 1-22.

(Continued)

*Primary Examiner* — Yong Chong
(74) *Attorney, Agent, or Firm* — Jeremy K. McKown

(57) ABSTRACT

The present invention relates to antifouling compositions and particularly to compositions which are able to provide an improved protecting effect against fouling organisms. More particularly, the present invention relates to synergistic antifouling compositions comprising an amount of at least 3.5 wt %, based on the total weight of the dry mass of the composition, of 4-bromo-2-(4-chlorophenyl)-5-(trifluoromethyl)-1H-pyrrole-3-carbonitrile, or a salt thereof, together with another biocide selected from bethoxazin, tolylfluanide, dichlofluanide, or DCOIT; for protecting materials against fouling organisms. This invention thus relates to the field of protection of materials, such as underwater objects, protection of wood, wood products, biodegradable materials and coatings.

3 Claims, No Drawings

(56) References Cited

OTHER PUBLICATIONS

Del Amo et al., "A multipurpose compound for protective coatings.", Colloids and Surfaces A: Physicochemical and Engineering Aspects, Jul. 1, 2008, pp. 58-64, vol. 324, Elsevier, XP027735387.
Raymond A. Cloyd (2011). Pesticide Mixtures, Pesticides—Formulations, Effects, Fate, Margarita Stoytcheva(Ed.), p. 69-80, InTech, Available from: http://www.intechopen.com/articles/show/title/pesticide-mixtures.
International Search Report Relating to International Patent Application: PCT/EP2011/060873. Date of Mailing date of International Search Report: Jul. 23, 2012.
Written Opinion of the International Searching Authority Relating to International Patent Application: PCT/EP2011/060873. Mailing date of the Written Opinion: Jul. 23, 2012.
International Search Report relating to International Patent Application No. PCT/EP02/12376. Date of Mailing of International Search Report: Dec. 3, 2003.
International Preliminary Examination Report relating to International Patent Application No. PCT/EP02/12376. Date of Completion of International Preliminary Examination Report: Mar. 5, 2004.
Limpel et al., "Weed control by dimethyl tetrachloroterephthalate alone and in certain combinations.", Proc. Northeast Weed Control Conf., 1962, pp. 48-53, vol. 16.
Colby, S.R., "Calculating Synergistic and Antagonistic Responses of Herbicide Combinations.", Weeds, Jan. 1967, pp. 20-22, vol. 15(1), Weed Science Society of America.
Richer, D.L., "Synergism—a patent view.", Pestic. Sci. 1987, pp. 309-315, vol. 19(4).

\* cited by examiner

SYNERGISTIC ANTIFOULING COMPOSITIONS COMPRISING 4-BROMO-2-(4-CHLOROPHENYL)-5-(TRIFLUOROMETHYL)-1H-PYRROLE-3-CARBONITRILE

This application is a divisional of U.S. application Ser. No. 11/698,631, filed Jan. 26, 2007 now abandoned, which is a continuation of U.S. application Ser. No. 10/494,751, filed May 3, 2004 now abandoned, which is the national stage of Application No. PCT/EP02/12376, filed Nov. 5, 2002, which application claims priority from European application EP 01204322.0, filed Nov. 8, 2001, the disclosures of which are hereby incorporated by reference.

The present invention relates to antifouling compositions and particularly to compositions which are able to provide an improved protecting effect against fouling organisms. More particularly, the present invention relates to synergistic antifouling compositions comprising an amount of at least 3.5 wt %, based on the total weight of the dry mass of the composition, of 4-bromo-2-(4-chlorophenyl)-5-(trifluoromethyl)-1H-pyrrole-3-carbonitrile, or a salt thereof, together with another biocide selected from bethoxazin, tolylfluanide, dichlofluanide, or DCOIT; for protecting materials against fouling organisms. This invention thus relates to the field of protection of materials, such as underwater objects, protection of wood, wood products, biodegradable materials and coatings.

It has now been found that, within certain broad limits of composition (i.e. in certain respective proportions or amounts of the active ingredients) easily determinable by those skilled in the art, the combination of 4-bromo-2-(4-chlorophenyl)-5-(trifluoromethyl)-1H-pyrrole-3-carbonitrile (hereinafter referred to as component I) and another biocide (hereinafter referred to as component II) selected from bethoxazin, tolylfluanide, dichlofluanide, or DCOIT, is able to provide a synergistic effect on the control of fouling organisms, i.e. a synergistic protecting effect against fouling organisms, especially algae. As used herein, "control" is defined to include both inhibition and removal. The amount of 4-bromo-2-(4-chlorophenyl)-5-(trifluoromethyl)-1H-pyrrole-3-carbonitrile in the antifouling compositions of the present invention is at least 3.5 wt %, based on the total weight of the dry mass of the composition.

4-Bromo-2-(4-chlorophenyl)-5-(trifluoromethyl)-1H-pyrrole-3-carbonitrile (referred to as component I) is disclosed in EP-0,312,723-A for controlling molluscs. Said compound may be represented by the formula:

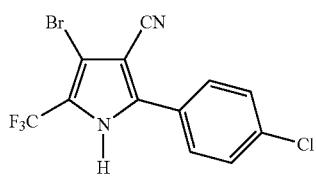

(I)

The components (II) are:

bethoxazin (component II-a) is disclosed in WO-95/06043 as a bactericidal and fungicidal compound useful in wood-protection and is also disclosed in WO-95/05739 for having antibacterial, anti-yeast, antifungal, algicidal, anti-crustacean and molluscicidal properties. It is the generic name of the compound 3-(benzo[b]thien-2-yl)-5,6-dihydro-1,4,2-oxathiazine 4-oxide, which compound may be represented by the formula

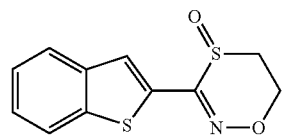

(II-a)

tolylfluanide (component II-b) has a similar activity as dichlofluanide but is better soluble in organic solvents and therefore easier to incorporate in coating formulations and impregnation agents. It is the generic name of the compound 1,1-dichloro-N-[(dimethylamino)sulfonyl]-1-fluoro-N-(4-methylphenyl)-methanesulfenamide, which may be represented by the formula

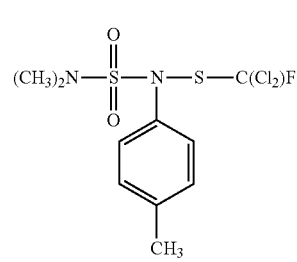

(II-b)

dichlofluanide (component II-c) has a broad spectrum antimicrobial activity and is used against wood-staining fungi in wood coatings and primers. It is the generic name of the compound 1,1-dichloro-N-[(dimethylamino)sulfonyl]-1-fluoro-N-phenyl-methanesulfenamide, which may be represented by the formula

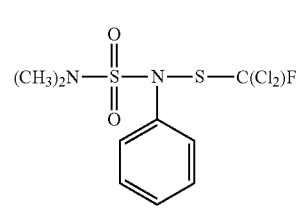

(II-c)

DCOIT (component II-d) is a broad spectrum biostat and is used in antifouling coatings and in wood preservatives. It is the generic name of the compound 4,5-dichloro-2-(n-octyl)-3(2H)-isothiazolone, which compound may be represented by the formula

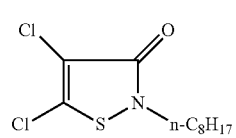

(II-d)

Compositions comprising component (I) as a barnaclecide in combination with an algicide have been disclosed in WO-98/12269.

Wherever the term "4-bromo-2-(4-chlorophenyl)-5-(trifluoromethyl)-1H-pyrrole-3-carbonitrile" or component (I), one of the components (II), component (II-a), component (II-b), component (II-c) or component (II-d) is used, it is meant to include said compound both in base or in salt form, the latter being obtained by reaction of the base form with an appropriate acid. Appropriate acids comprise, for example, inorganic acids, such as the hydrohalic acids, i.e. hydrofluoric, hydrochloric, hydrobromic and hydroiodic, sulfuric acid, nitric acid, phosphoric acid, phosphinic acid and the like; or organic acids, such as, for example, acetic, propanoic, hydroxyacetic, 2-hydroxypropanoic, 2-oxopropanoic, ethanedioic, propanedioic, butanedioic, (Z)-2-butenedioic, (E)-2-butenedioic, 2-hydroxybutanedioic, 2,3-dihydroxybutanedioic, 2-hydroxy-1,2,3-propanetricarboxylic, methanesulfonic, ethanesulfonic, benzenesulfonic, 4-methyl-benzenesulfonic, cyclohexanesulfamic, 2-hydroxybenzoic, 4-amino-2-hydroxybenzoic and the like acids. Said component (I) and components (II) may also exist in the form of solvates, such as hydrates.

Surfaces or objects exposed to humid or aqueous environments are readily colonized by aquatic organisms such as algae, fungi, bacteria, microbes, and aquatic animals such as, e.g. tunicates, hydroids, bivalves, bryozoans, polychaete worms, sponges, barnacles, molluscs and crustacea. As these organisms settle on or attach to said surfaces, the value of the exposed objects diminishes. The attachment or settlement of said organisms is also known as 'fouling' of a structure. The exterior, but possibly also the interior of the object may deteriorate, the surface changes, e.g. from smooth, clean and streamlined to rough, foul and turbulent, the weight of the object increases by the deposit of the organisms and their remnants, and the vicinity of the object may become obstructed or encumbered. The function of the object and system involved lowers and the quality of the aqueous environment deteriorates. The common method of controlling the attachment of fouling organisms is by treating the structure to be protected with a coating which comprises an antifouling agent.

Fouling of surfaces or objects exposed to humid or aqueous environments often starts with the attachment or settlement of algae. This roughens the smooth surface thereby easing the settlement of other fouling organisms such as, e.g. tunicates, barnacles, crustacea, molluscs and the like. Hence, the algicidal properties of antifouling compositions which protect surfaces from fouling are of primary interest.

The compositions of the present invention are especially suitable to protect surfaces or objects in constant or frequent contact with water from fouling or attachment or settlement of algae, by applying to said surfaces or objects a synergistic antifouling composition comprising component (I), in an amount of at least 3.5 wt % based on the total weight of the dry mass of the composition, and one of the components (II) in respective proportions such as to provide a synergistic effect against fouling organisms. Examples of said surfaces or objects are for instance, shiphulls, harbor installations, piers and pilings, drying docks, sluice-gates, locks, mooring masts, buoys, offshore oil rigging equipment, drilling platforms, bridges, pipelines, fishing nets, cables, ballast water tanks, ship reservoirs that draw water from infested bodies of water, recreational equipment, such as surfboards, jet skis, and water skis, and any other object in constant or frequent contact with water.

The invention also provides a method to protect materials, in particular surfaces or objects in frequent or constant contact with water, against fouling organisms by applying to said objects an antifouling composition comprising an effective antifouling amount of at least 3.5 wt % based on the total weight of the dry mass of the composition of component (I) in combination with one of the components (II) in respective proportions such as to provide a synergistic effect against fouling organisms.

The present invention further provides a method of protecting a surface which comprises applying to the surface an antifouling composition in accordance with the invention. An especially important use of the method of the invention comprises a method for inhibiting fouling of a ship's hull, which comprises applying to the hull an antifouling composition in accordance with the invention. Fouling on the hulls of ships for example increases frictional drag with a corresponding decrease in speed and maneuverability and an increase in fuel consumption and increased maintenance costs associated with removal of the fouling.

Further, antifouling compositions in accordance with the invention can be used to protect constructions such as, e.g. swimming pools, baths, cooling water circulation circuits and industrial baths in various installations, e.g. in manufacturing plants or in air-conditioning installations, the function of which can be impaired by the presence and/or the multiplication of fouling organisms. Further examples are buildings and parts of buildings such as floors, outer and inner walls or ceilings, or places suffering from dampness such as cellars, bathrooms, kitchens, washing houses and the like, and which are hot-beds for fouling. Fouling not only is problematic from the viewpoint of hygiene and aesthetics, but also causes economic losses because said buildings and/or decorating materials deteriorate more rapidly than desired.

The synergistic antifouling compositions of the present invention can also be used in a variety of applications:
  industrial aqueous process fluids, e.g. cooling waters, pulp and paper mill process waters and suspensions, secondary oil recovery systems, spinning fluids, metal working fluids, and the like
  in-tank/in-can protection of aqueous functional fluids, e.g. polymer emulsions, water based paints and adhesives, glues, starch slurries, thickener solutions, gelatin, wax emulsions, inks, polishes, pigment and mineral slurries, rubber latexes, concrete additives, drilling mud's, toiletries, aqueous cosmetic formulations, pharmaceutical formulations, and the like.

The term "fouling organisms" is meant to comprise organisms that attach, settle, grow on or adhere to various kinds of surfaces, in particular in humid or aqueous environments such as, marine waters, fresh waters, brackish waters, rain water, and also cooling water, drainage water, waste water and sewage. Fouling organisms are Algae such as, for example, Microalgae, e.g. *Amphora, Achnanthes, Navicula, Amphiprora, Melosira, Cocconeis, Chlamydomonas, Chlorella, Ulothrix, Anabaena, Phaeodactylum, Porphyridium*; Macroalgae, e.g. *Enteromorpha, Cladophora, Ectocarpus, Acrochaetium, Ceramium, Polysiphonia* and *Hormidium* sp.; fungi; microbes; tunicates, including members of the class Ascidiacea such as *Ciona intestinalis, Diplosoma listerianium*, and *Botryllus schlosseri*; members of the class Hydrozoa, including *Clava squamata, Hydractinia echinata, Obelia geniculata* and *Tubularia larynx*; bivalves, including *Mytilus edulis, Crassostrea virginica, Ostrea edulis, Ostrea chilensia, Dreissena polymorpha* (zebra mussels) and *Lasaea rubra*; bryozoans, including *Electra pilosa, Bugula neritina*, and *Bowerbankia gracilis*; polychaete worms, including *Hydroides norvegica*; sponges; and members of the class Crustacea, including *Artemia*, and Cirripedia (barnacles), such as *Balanus amphitrite, Lepas anatifera, Balanus balanus, Balanus balanoides, Balanus hameri, Balanus crenatus, Balanus improvisus, Balanus galeatus*, and *Balanus eburneus*; and *Elminius modestus*, and *Verruca*.

The relative proportions of component (I) and (II) in the embodied compositions are those proportions which result in unexpected synergistic efficacy against fouling organisms, especially against algae, when compared to a composition including, as an active ingredient, either component (I) alone or a component (II) alone. As will readily be understood by those skilled in the art, the said synergistic efficacy may be obtained within various proportions of components (I) and (II) in the composition, depending on the kind of fouling organism towards which efficacy is measured and the substrate to be treated. Based on the teachings of the present application, determination of the synergistic or possibly (for some proportions of components (I) and (II) applied to specific fouling organisms) non-synergistic efficacy of such compositions is well within the routine work of those skilled in the art. As a general rule, however, it may be said that for most fouling organisms the suitable proportions by weight of the amount of component (I) to component (II) in the active composition should lie in the range from 10:1 to 1:10. Preferably, this range is from 3:1 to 1:2, more preferably from 2:1 to 1:1. A particular ratio for the antifouling compositions of the present invention is a 1:1 ratio between component (I) and one of the components (II).

Particular compositions of the present invention are those compositions comprising a combination of component (I), in an amount of at least 3.5 wt % based on the total weight of the dry mass of the composition, and a component (II) selected from component (II-a) (i.e. bethoxazin), or component (II-b) (i.e. tolylfluanide), in respective proportions such as to provide a synergistic effect against fouling organisms.

Other particular compositions of the present invention are those compositions comprising a combination of component (I), in an amount of at least 3.5 wt % based on the total weight of the dry mass of the composition, and a component (II) selected from component (II-c) (i.e. dichlofluanide), or component (II-d) (i.e. DCOIT), in respective proportions such as to provide a synergistic effect against fouling organisms.

A very particular composition of the present invention is a composition comprising a combination of component (I), in an amount of at least 3.5 wt % based on the total weight of the dry mass of the composition, and component (II-a) (i.e. bethoxazin) in respective proportions such as to provide a synergistic effect against fouling organisms.

The active ingredients of the components (I) and (II) for use in the compositions according to the present invention should preferably be present in a substantially pure form, i.e. free from chemical impurities (such as co-products or residual solvents) resulting from their manufacturing and/or handling processes in view to safely control the fouling organism management programs for which they are intended. The active ingredients of the components (I) and (II) for use in the compositions according to the present invention may be present, when they possess at least an asymmetric carbon atom, either as a racemic mixture or in the form of a substantially pure stereoisomer or enantiomer of the said compound obtained from the racemic mixture by standard fractionation methods, including simulated moving bed technology. The term "substantially pure" as used hereinbefore means a purity (either chemical or optical), as determined by methods conventional in the art such as high performance liquid chromatography or optical methods, of at least about 96%, preferably at least 98% and more preferably at least 99%.

The quantity of each of the active ingredients in the compositions according to the present invention will be so that a synergistic antifouling effect is obtained. In particular it is contemplated that the ready to use compositions of the present invention comprise component (I) in an amount of at least 3.5 wt % based on the total weight of the dry mass of the composition. More particular such ready to use compositions comprise component (I) in an amount from 4 wt % to 6 wt % based on the total weight of the dry mass of the composition. The amount of component (II) in said ready to use compositions will be so that a synergistic antifouling effect is obtained. In particular the amount of component (II) may range from 1 wt % to 20 wt %, more particular from 3.5 wt % to 6 wt % based on the total weight of the dry mass of the composition. In many instances the antifouling compositions to be used directly can be obtained from concentrates, such as e.g. emulsifiable concentrates, suspension concentrates, or soluble concentrates, upon dilution with aqueous or organic media, such concentrates being intended to be covered by the term composition as used in the definitions of the present invention. Such concentrates can be diluted to a ready to use mixture in a spray tank shortly before use.

The combination of components (I) and (II) is thus suitably used together with carriers and additives, including wetting agents, dispersing agents, stickers, adhesives, emulsifying agents and the like such as those conventionally employed in the art of formulation. The antifouling compositions of the present invention may be prepared in any known manner, for instance by homogeneously mixing, coating and/or grinding the combination of active ingredients (i.e. component (I) and one of the components (II)), in a one-step or multi-steps procedure, with the selected carrier material and, where appropriate, the other additives such as surface-active agents.

Examples of inert carrier materials suitable for use as solid carriers in the present invention, e.g. for dust concentrates and granular formulations, include natural and synthetic mineral fillers, for instance magnesium silicates such as talc; silica such as diatomaceous earth; aluminium silicate such as kaolinite, montmorillonite or mica; magnesium aluminium silicate such as attapulgite and vermiculite; calcium carbonate and calcium sulphate; carbon such as charcoal; sulphur; and highly dispersed silicic acid polymers. Suitable granulated absorbent carrier materials may be porous, for example pumice, broken brick, sepiolite or bentonite. In addition, a great number of pre-granulated materials or inorganic or organic nature can be used, e.g. especially dolomite or pulverised plant residues. Other inert carrier materials suitable for use as organic solid carriers include natural and synthetic resins (whether crude or formulated), for example organic waste polymeric products such as polyvinyl chloride, polyethylene, polypropylene, polyacrylates such as polymethylmethacrylate, polystyrene and mixed polymerisates thereof.

Suitable surface-active agents to be used in the antifouling compositions of the present invention are non-ionic, cationic and/or anionic materials having good emulsifying, dispersing and/or wetting properties. Suitable anionic surfactants include both water-soluble soaps and water-soluble synthetic surface-active agents. Suitable soaps are alkaline or alkaline-earth metal salts, unsubstituted or substituted ammonium salts of higher fatty acids ($C_{10}$-$C_{22}$), e.g. the sodium or potassium salts of oleic or stearic acid, or of natural fatty acid mixtures obtainable form coconut oil or tallow oil. Synthetic surfactants include sodium or calcium salts of polyacrylic acids; fatty sulphonates and sulphates; sulphonated benzimidazole derivatives and alkylarylsulphonates. Fatty sulphonates or sulphates are usually in the form of alkaline or alkaline-earth metal salts, unsubstituted ammonium salts or ammonium salts substituted with an alkyl or acyl radical having from 8 to 22 carbon atoms, e.g. the sodium or calcium salt of lignosulphonic acid or dodecylsulphonic acid or a mixture of fatty alcohol sulphates obtained from natural fatty acids, alkaline or alkaline-earth metal salts of sulphuric or sulphonic acid esters (such as sodium lauryl sulphate) and sulphonic acids of fatty alcohol/ethylene oxide adducts. Suitable sulphonated benzimidazole derivatives preferably contain 8 to 22 carbon atoms. Examples of alkylarylsulphonates are the sodium, calcium or alcanolamine salts of dodecylbenzene sulphonic acid or dibutyl-naphtalenesulphonic acid or a naphtalene-sulphonic acid/formaldehyde condensation product. Also suitable are the corresponding phosphates, e.g. salts of phosphoric acid ester and an adduct of p-nonylphenol with ethylene and/or propylene oxide, or phospholipids. Suitable phospholipids for this purpose are the natural (originating from animal or plant cells) or synthetic phospholipids of the cephalin or lecithin type such as e.g. phosphatidylethanolamine, phosphatidylserine, phosphatidylglycerine, lysolecithin, cardiolipin, dioctanylphosphatidyl-choline, dipalmitoylphoshatidylcholine and their mixtures.

Suitable non-ionic surfactants include polyethoxylated and polypropoxylated derivatives of alkylphenols, fatty alcohols, fatty acids, aliphatic amines or amides containing at least 12 carbon atoms in the molecule, alkylarenesulphonates and dialkylsulphosuccinates, such as polyglycol ether derivatives of aliphatic and cycloaliphatic alcohols, saturated and unsaturated fatty acids and alkylphenols, said derivatives preferably containing 3 to 10 glycol ether groups and 8 to 20 carbon atoms in the (aliphatic) hydrocarbon moiety and 6 to 18 carbon atoms in the alkyl moiety of the alkylphenol. Further suitable non-ionic surfactants are water-soluble adducts of polyethylene oxide with poylypropylene glycol, ethylenediaminopolypropylene glycol containing 1 to 10 carbon atoms in the alkyl chain, which adducts contain 20 to 250 ethyleneglycol ether groups and/or 10 to 100 propyleneglycol ether groups. Such compounds usually contain from 1 to 5 ethyleneglycol units per propyleneglycol unit. Representative examples of non-ionic surfactants are nonylphenolpolyethoxyethanol, castor oil polyglycolic ethers, polypropylene/polyethylene oxide adducts, tributylphenoxypolyethoxyethanol, polyethyleneglycol and octylphenoxypolyethoxyethanol. Fatty acid esters of polyethylene sorbitan (such as polyoxyethylene sorbitan trioleate), glycerol, sorbitan, sucrose and pentaerythritol are also suitable non-ionic surfactants.

Suitable cationic surfactants include quaternary ammonium salts, preferably halides, having 4 hydrocarbon radicals optionally substituted with halo, phenyl, substituted phenyl or hydroxy; for instance quaternary ammonium salts containing as N-substituent at least one $C_8$-$C_{22}$ alkyl radical (e.g. cetyl, lauryl, palmityl, myristyl, oleyl and the like) and, as further substituents, unsubstituted or halogenated lower alkyl, benzyl and/or hydroxy-lower alkyl radicals.

A more detailed description of surface-active agents which are conventional and suitable for this purpose may be found for instance in the following publications: "McCutcheon's Detergents and Emulsifiers Annual" (MC Publishing Crop., Ridgewood, N.J., 1981); "Tensid-Taschenbuch", $2^{nd}$ ed. (Hanser Verlag, Vienna, 1981) and "Encyclopaedia of Surfactants (Chemical Publishing Co., New York, 1980-1981).

Alternatively, an emulsifiable concentrate formulation of the composition according to the present invention can also be obtained upon dilution of the combination of components (I) and (II) with at least a suitable organic solvent (i.e. a liquid carrier) followed by the addition of at least a solvent-soluble emulsifying agent. Solvents suitable for this type of formulation are usually water-immiscible and belong to the hydrocarbon, chlorinated hydrocarbon, ketone, ester, alcohol and amide classes of solvents, and they can be properly selected by those skilled in the art based on the solubility's of components (I) and (II) respectively. Emulsifiable concentrates usually contain, in addition to the organic solvent(s), from about 10 to 50% by weight of the combination of active ingredients, from about 2 to 20% of emulsifying agent(s) and up to 20% other additives such as stabilisers, corrosion inhibitors and the like. The combination of components (I) and (II) may also be formulated as a suspension concentrate, which is a stable suspension of the active ingredients in a (preferably organic) liquid intended to be diluted with water before use. In order to obtain such a non-sedimenting flowable product, it is usually necessary to incorporate therein up to about 10% by weight of at least a suspending agent selected from known protective colloids and thixotropic agents. Other liquid formulations like aqueous dispersions and emulsions, for example obtained by diluting a wettable powder or a concentrate (such as previously described) with water, and which may be of the water-in-oil or the oil-in-water type, also lie within the scope of the present invention.

The present invention also provides protective compositions, for instance in the form of paints, coatings or varnishes, comprising the said combination of components (I) and (II) together with one or more additives suitable for their formulation. The total amount of the combination of components (I) and (II) in such protective compositions may range from 2 to 10% (w/v). Suitable additives for use in said protective compositions are quite conventional in the art and include, for instance, at least an organic binder (preferably in aqueous form) such as an acrylic or vinyl-based emulsion or rosin compounds; mineral carriers such as calcium carbonate; surface-active agents such as previously described with respect to the formulation of agronomic compositions; viscosity regulators; corrosion inhibitors; pigments such as titanium dioxide; stabilisers such as sodium benzoate, sodium hexametaphosphate and sodium nitrite; mineral or organic colorants and the like. The ways of formulating such additives together with active biocidal ingredients such as those of the present invention is also well within the knowledge of those skilled in the art. Such protective compositions may be used not only to cure and/or limit the damaging effects of fouling organisms but also in order to prevent deterioration to occur on materials which may be subjected to the harmful environment and effects of fouling organisms.

Other appropriate additives for use in the antifouling compositions of the present invention may be solid or liquid and are suitable substances known in the art for preparing formulations for treating surfaces or objects exposed to humid or aqueous environments, while providing a further protective effect namely for storing and handling purposes. Such additives may comprise, for example, polymers or copolymers, resins, and other optional additives such as, water-repelling agents; surface slipping agents; diluents; organic binding agents; insecticides; fungicides; bactericides; auxiliary solvents; processing additives; fixatives; thickening agents; plasticizers; UV-stabilizers; stabilisers against heat or light; dyes; color pigments; siccatives; corrosion inhibitors; anti-settling agents; anti-skinning agents; and antifoaming agents and the like.

The antifouling compositions according to the present invention can be applied by a number of conventional methods, such as hydraulic spray, air-blast spray, aerial spray, atomising, dusting, scattering or pouring. The most appropriate method will be chosen by those skilled in the art in accordance with the intended objectives and the prevailing circumstances, namely the kind of fouling organism to be controlled, the type of equipment available and the type of material to be protected.

As previously indicated, the combination of components (I) and (II) is preferably applied in the form of compositions wherein both said ingredients are intimately admixed in order to ensure simultaneous administration to the materials to be protected. Administration or application of both components (I) and (II) can also be a "sequential-combined" administration or application, i.e. component (I) and component (II) are administered or applied alternatively or sequentially in the same place in such a way that they will necessarily become admixed together at the locus to be treated. This will be achieved namely if sequential administration or application takes place within a short period of time e.g. within less than 24 hours, preferably less than 12 hours. This alternative method can be carried out for instance by using a suitable single package comprising at least one container filled with a formulation comprising the active component (I) and at least one container filled with a formulation comprising an active component (II). Therefore the present invention also encompasses a product containing:

(a) a composition comprising an amount of at least 3.5 wt %, based on the total weight of the dry mass of the composition of 4-bromo-2-(4-chlorophenyl)-5-(trifluoromethyl)-1H-pyrrole-3-carbonitrile as component (I), and (b) a composition comprising an active component (II), selected from bethoxazin, tolylfluanide, dichlofluanide, or DCOIT, as a combination for simultaneous or sequential use, wherein said (a) and (b) are in respective proportions such as to provide a synergistic effect against fouling organisms, in particular algae.

The following examples are intended illustrate the scope of the invention.

EXAMPLES

1. Poison Plate Assay in 96 Multi-Well Plates

Activity against algae growth was determined with the poison plate assay. A calculated amount of a stock solution (containing either 4-bromo-2-(4-chlorophenyl)-5-(trifluoromethyl)-1H-pyrrole-3-carbonitrile, bethoxazin, DCOIT, dichlofluanide, or tolylfluanide in DMSO) was pipetted into multiwell plates in order to reach a final test concentration ranging from 0.05 to 100 ppm and mixed with a warm culture medium. The medium was inoculated with 300 µl of an algal suspension. The multi-well plates were kept at 21° C., a relative humidity of 65% and light-dark cycle of 16 hours a day (1000 Lux photoperiod).

The lowest concentration of each test compound or mixture of test compounds sufficient to inhibit visible growth was taken as the minimum inhibitory concentration (MIC). The MIC were taken as end points of activity. End points for the combinations of component (I) with one of the components (II) were then compared with the end points for the pure active test compound when employed individually.

Synergism between component (I) and one of the components (II) was determined by a commonly used and accepted method described by Kull F. C. et al. in *Applied Microbiology*, 9, 538-541 (1961) using the Synergy Index, which is calculated as follows for two compounds A and B:

$$\text{Synergy Index } (SI) = \frac{Q_a}{Q_A} + \frac{Q_b}{Q_B}$$

wherein:
- $Q_A$ is the concentration of compound A in ppm, acting alone, which produced an end point (e.g. MIC),
- $Q_a$ is the concentration of compound A in ppm, in the mixture, which produced an end point (e.g. MIC),
- $Q_B$ is the concentration of compound B in ppm, acting alone, which produced an end point (e.g. MIC),
- $Q_b$ is the concentration of compound B in ppm, in the mixture, which produced an end point (e.g. MIC).

When the Synergy Index is greater than 1.0, antagonism is indicated. When the SI is equal to 1.0, additivity is indicated. When the SI is less than 1.0, synergism is demonstrated.

TABLE 1

MIC-values (minimum inhibitory concentration in ppm) and synergy index of various active ingredients and their combination against *Chlorella vulgaris* (CCAP 211/12) (incubation time: 18 days).

|  | ratio (I) to (II) | MIC-values | synergy index |
|---|---|---|---|
| component (I) | single | 100* | — |
| component (II-a) | single | 1.6 | — |
| (I) + (II-a) | 1:3 | 1.6 | 0.75 |
| (I) + (II-a) | 1:1 | 3.1 | 0.98 |
| (I) + (II-a) | 3:1 | 6.2 | 1.02 |
| component (I) | single | 100* | — |
| component (II-b) | single | 25 | — |
| (I) + (II-b) | 1:3 | 12.5 | 0.41 |
| (I) + (II-b) | 1:1 | 25 | 0.63 |
| (I) + (II-b) | 3:1 | 25 | 0.44 |
| component (I) | single | 100* | — |
| component (II-c) | single | 25 | — |
| (I) + (II-c) | 1:3 | 25 | 0.81 |
| (I) + (II-c) | 1:1 | 25 | 0.63 |
| (I) + (II-c) | 3:1 | 25 | 0.44 |
| component (I) | single | 100* | — |
| component (II-d) | single | 1.6 | — |
| (I) + (II-d) | 1:3 | 1.6 | 0.75 |
| (I) + (II-d) | 1:1 | 3.1 | 0.98 |
| (I) + (II-d) | 3:1 | 6.2 | 1.02 |

*MIC-value of component (I) for this organism is situated above 100 ppm, but this value was used to calculate the SI

TABLE 2

MIC-values (minimum inhibitory concentration in ppm) and synergy index of various active ingredients and their combination against *Stichococcus bacillaris* (CCAP 379/1A) (incubation time: 18 days).

|  | ratio (I) to (II) | MIC-values | synergy index |
|---|---|---|---|
| component (I) | single | 100* | — |
| component (II-a) | single | 6.2 | — |
| (I) + (II-a) | 1:3 | 6.2 | 0.77 |
| (I) + (II-a) | 1:1 | 6.2 | 0.53 |
| (I) + (II-a) | 3:1 | 12.5 | 0.60 |
| component (I) | single | 100* | — |
| component (II-b) | single | 12.5 | — |
| (I) + (II-b) | 1:3 | 6.2 | 0.39 |
| (I) + (II-b) | 1:1 | 12.5 | 0.56 |
| (I) + (II-b) | 3:1 | 12.5 | 0.34 |
| component (I) | single | 100* | — |
| component (II-c) | single | 25 | — |
| (I) + (II-c) | 1:3 | 12.5 | 0.41 |
| (I) + (II-c) | 1:1 | 12.5 | 0.31 |
| (I) + (II-c) | 3:1 | 12.5 | 0.22 |
| component (I) | single | 100* | — |
| component (II-d) | single | 1.6 | — |
| (I) + (II-d) | 1:3 | 1.6 | 0.75 |
| (I) + (II-d) | 1:1 | 1.6 | 0.51 |
| (I) + (II-d) | 3:1 | 6.2 | 1.02 |

*MIC-value of component (I) for this organism is situated above 100 ppm, but this value was used to calculate the SI

2. Antifouling Paint Examples

Examples 1 to 4 show conventional rosin based antifouling paint compositions.

Rosin is a solid material that e.g. occurs naturally in the oleo resin of pine trees and is typically derived from the oleo resinous exudate of the living tree, from aged stumps and from tall oil produced as a by-product of kraft paper manufacture. Rosin is typically classed as gum rosin, wood rosin, or as tall oil rosin which indicates its source.

|  |  | Composition (parts by weight) | | | |
|---|---|---|---|---|---|
|  | Example | 1 | 2 | 3 | 4 |
| dry mass | rosin | 34 | 34 | 34 | 34 |
|  | chlorinated paraffin | 12 | 12 | 12 | 12 |
|  | zinc oxide | 6 | 6 | 6 | 6 |
|  | TiO$_2$ | 3 | 3 | 3 | 3 |
|  | China clay | 30 | 30 | 30 | 30 |
|  | bentonite | 3 | 3 | 3 | 3 |
|  | dye | 3 | 3 | 3 | 3 |
|  | component (I) | 4 | 4 | 4 | 4 |
|  | component (II-a) | 5 | — | — | — |
|  | component (II-b) | — | 5 | — | — |
|  | component (II-c) | — | — | 5 | — |
|  | component (II-d) | — | — | — | 5 |
|  | total dry mass | 100 | 100 | 100 | 100 |
| paint | ethanol | 1 | 1 | 1 | 1 |
| formulation | xylene | 42 | 42 | 42 | 42 |

The invention claimed is:

1. A composition comprising as component (I), 4-bromo-2-(4-chlorophenyl)-5-(trifluoromethyl)-1H-pyrrole-3-carbonitrile, in an amount of at least 15 wt % based on the total weight of the dry mass of the composition, and a component (II), selected from tolylfluanide or dichlofluanide wherein the ratio by weight of component (I) to component (II) ranges from 3:1 to 1:2 to provide a synergistic effect against fouling organisms, and a carrier.

2. A composition according to claim 1 wherein the amount of component (I) ranges from 4 wt % to 6 wt % based on the total weight of the dry mass of the composition.

3. A composition according to claim 1 wherein the amount of component (II) ranges from 3 wt % to 6 wt % based on the total weight of the dry mass of the composition.

* * * * *